W. MEYER.
X-RAY APPARATUS.
APPLICATION FILED NOV. 17, 1920.
1,430,096.
Patented Sept. 26, 1922.
2 SHEETS—SHEET 2.
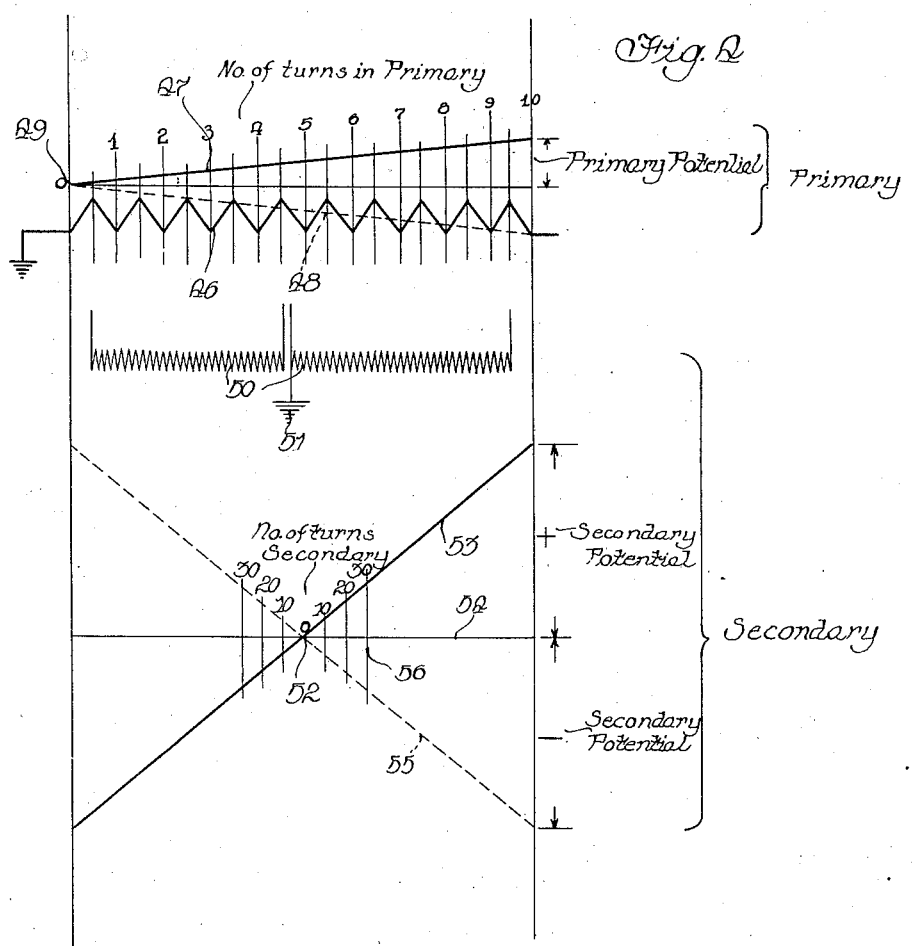
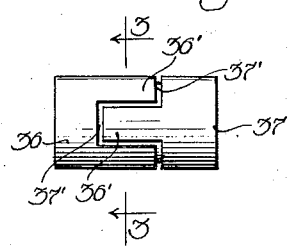
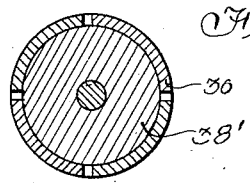
Inventor
William Meyer
By Brown Boettcher Dienner
Attorneys Patented Sept. 26, 1922.

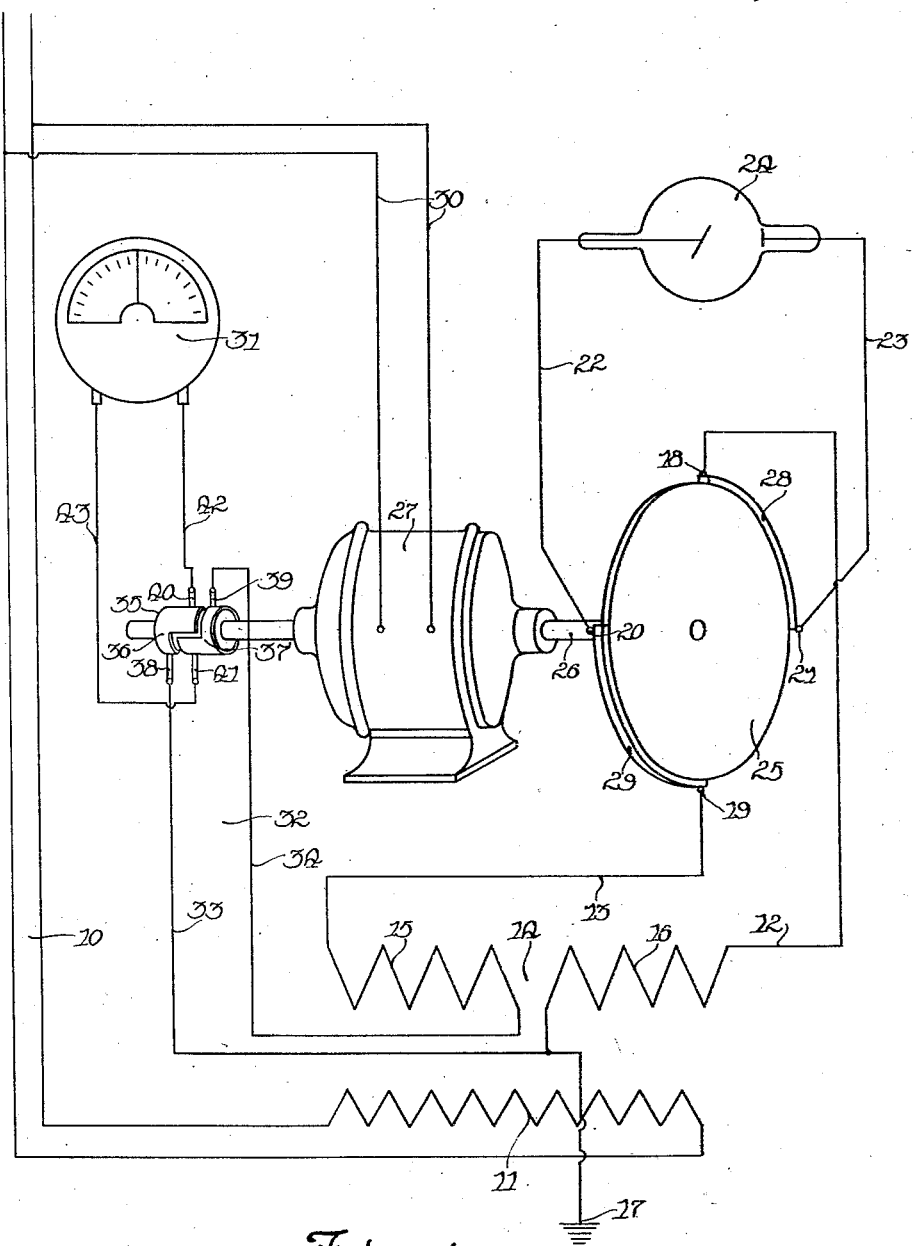

1,430,096

UNITED STATES PATENT OFFICE.

WILLIAM MEYER, OF CHICAGO, ILLINOIS.

X-RAY APPARATUS.

Application filed November 17, 1920. Serial No. 424,600.

*To all whom it may concern:*

Be it known that I, WILLIAM MEYER, a citizen of the United States, residing at Chicago, in the county of Cook and State of Illinois, have invented a certain new and useful Improvement in X-Ray Apparatus, of which the following is a full, clear, concise, and exact description, reference being had to the accompanying drawings, forming a part of this specification.

This invention relates to X-ray apparatus, and has for its primary aim to improve the circuit arrangement of the apparatus in so far as the location of the current measuring device or milliammeter in the circuit is concerned.

It has been common practice to interpose a current measuring device, such as a milliammeter, in the secondary high tension circuit of the apparatus between the rectifier and the X-ray tube, for indicating the amount of current passing through the X-ray tube. This arangement requires that the milliammeter or other measuring device be made relatively large in order that it may be read at a distance which will insure safety from the high tension and the meter is generally provided with a shunt condenser for preventing damage to the delicate mechanism of the meter. This, of necessity, increases the cost of manufacture and when the milliammeter is so arranged in the circuit the meter is dangerous to approach or touch while the apparatus is in operation.

It is desirable that the meter be located at a point remote from the transformer and remote from the high tension circuit leading to the tube. It is an object of my invention to accomplish this in a simple and inexpensive manner.

Briefly stated, my invention consists in connecting the milliammeter through a commutating device operating synchronously with the rectifier at the ground point in the secondary winding of the transformer. Thus, the milliammeter may be placed at any point convenient to the operator, either on the usual switchboard or on a specially constructed support where the instrument may be conveniently read.

A more concrete understanding of my invention may be obtained from the following detailed description taken in connection with the accompanying drawing.

Figure 1 is a diagram of the circuits of an X-ray apparatus embodying the improvement of my invention;

Figure 2 is a plan view of the commutating device;

Figure 3 is a sectional view taken on the line 3—3 of Figure 2, looking in the direction of the arrows; and, Figure 4 is a diagrammatic view illustrating the principle involved in this invention.

Referring to the drawing, 10 designates the primary circuit to which an alternating current of relatively low potential and any desired frequency is supplied, said circuit being connected to the primary winding 11 of a transformer T.

For convenience, I shall describe but briefly the X-ray circuit, this circuit being composed of the conductors 12 and 13 connected at the opposite extremities of the transformer secondary winding 14, this winding being in two sections 15 and 16, the sections being connected in a manner which will presently be described. The section 16 may be grounded as at 17 so as to insure the existence of a ground point in the winding. I do not limit the invention to a circuit in which the ground points would be as shown in the drawing, as it is quite possible that at some other point in the secondary circuit a ground part could be had. However, for the purposes of this description the ground point has been considered as midway between the two sections 15 and 16 of the secondary winding.

The conductors 12 and 13 terminate at contact members 18 and 19 and the secondary circuit continues from the contact members 20 and 21 through conductors 22 and 23 to the X-ray tube 24.

The contact members 18, 19, 20 and 21 are arranged at 90 degrees about a disc or wheel 25 of insulating material mounted on a shaft 26, said shaft forming the armature shaft of a motor 27. The circuit is closed intermittently between certain pairs of the contact members by segmental conducting plates 28 and 29 carried at the periphery of the wheel or disc 25. The motor is connected to the primary circuit by means of conductors 30—30, and is of the synchronous type.

A milliammeter 31 is provided, located at some convenient point for the operator, as for instance on the switchboard adjacent the control apparatus, at the ground point in the secondary circuit in a manner which will now be described. A circuit 32 composed of the conductors 33 and 34 is in series with the sections 15 and 16 of the secondary winding 14, a four-part commutator 35 having the segments 36 and 37 interposed in said circuit 32, said commutator being carried by the armature shaft 26 and operating synchronously with the disc 25. The conductors 33 and 34 terminate at brushes 38 and 39 under which the end portions of the segments 36 and 37 continuously rotate. Additional brushes 40 and 41 serve to connect the conductors 42 and 43, respectively, to the conductors 33 and 34 alternately, said brushes contacting with the central commutating portions of the commutator segments. The conductors 42 and 43 are connected to the milliammeter 31.

Upon reference to Figure 2 it will be seen that the commutating device consists of the two portions 36 and 37 as previously pointed out, these portions being provided with co-operating tongues 36' and slots 37', making up, when assembled, on an insulated bushing 38', a four-part commutator as illustrated in Figure 3.

During operation, current is delivered to the primary winding 11 and a synchronous current of high tension is induced in the secondary winding 14. The high potential developed in the secondary circuit is delivered through the conductors 12 and 13 to the rectifier and is there changed to uni-directional pulsating current in the usual manner. However, the ammeter being tapped into the secondary winding at the ground point and being in series with the winding having its circuit commutated synchronously indicates the amount of current delivered through the tube. It is necessary that the commutator be synchronous with the rectifier in order that the milliammeter will properly indicate the amount of current flow in the secondary circuit. The fixed relation of commutator and rectifier also permits of an indication of the direction of the current. I desire to point out that while the connection of the ammeter has been illustrated as embodied in a particular type of circuit arrangement that any other of the standard circuits could be modified in accordance with my invention, as long as the ammeter is connected at the ground point of the secondary winding or the secondary circuit.

Referring to Figure 4, the primary winding is indicated at 46, and comprises a desired number of convolutions or turns, in the present diagram, 10 in number. The secondary winding 50 comprises any number of convolutions in excess of that of the primary winding to obtain the desired step-up in voltage. The line 47 above the primary winding indicates the relative potential of the convolutions of the primary winding for each wave of current from zero to maximum. The dotted line 48 indicates a wave in the opposite direction, it being assumed that the ground or zero point of the primary winding is at 49. Thus, the waves of potential in the primary winding swing about the point 49 in accordance with the frequency of the alternating current delivered to the winding. However, in the case of the secondary winding 50, the intermediate portion thereof is grounded at 51 to ensure a ground or zero condition of potential at that point. Thus, it will be seen that the potential of the two sections of the secondary winding will, in response to induction from the primary winding upon each wave of potential therein, oscillate about the zero point 52 into the full line position 53 above and below the line 54, and into the dotted line position 55 upon a reversal of current in the primary winding. The lines 56 indicate the number of turns in the secondary winding, these turns being usually of the order of six hundred to one thousand turns to one in the primary winding. Of course, the angles of the lines 53 and 55 are greater than those of the lines 47 and 48, as the difference of potential between zero and the crest of wave will be considerably greater in the secondary winding.

The foregoing principle, in conjunction with the other circuit arrangements, embodies a feature which is not found in the prior art. By this arrangement connection of the milliammeter in the circuit is simultaneous with that of the X-ray tube, thereby efficiently indicating the current flowing without danger to the operator.

While I have shown and described a preferred embodiment of my invention, I reserve the right to make changes in the details thereof which do not depart from the spirit and scope of the invention as claimed.

I claim:

1. In combination, a transformer comprising a primary winding and a secondary winding, said secondary winding comprising two sections, primary and secondary circuits for the primary and secondary windings, a fixed ground connection between said secondary winding sections, a commutator and a uni-directional current meter connected through said commutator in series with the secondary winding at the fixed ground connection between the sections thereof.

2. In combination, a transformer comprising a primary winding and a secondary winding, primary and secondary circuits for said windings, a uni-directional current meter, a commutator, said secondary winding comprising two sections invariably connected together at a fixed ground point and in the same relation electrically in series through said meter and said commutator, said meter and said commutator lying in the fixed ground connection between said two sections, and a high voltage rectifier connected in series with the secondary circuit.

3. In combination, a primary winding, a secondary winding, said secondary winding having terminals and a fixed ground point substantially centrally therebetween, a rectifier connected across the terminals of the secondary winding, a commutator and a meter connected through said commutator in series with the secondary winding at the fixed ground point provided centrally between the terminals thereof.

In witness whereof, I hereunto subscribe my name this 9th day of November, 1920.

WILLIAM MEYER.